(12) United States Patent
Min (10) Patent No.: US 9,869,490 B2
(45) Date of Patent: Jan. 16, 2018

(54) BOILER HAVING INCREASED INDOOR HEATING EFFICIENCY AND ENABLING SIMULTANEOUS USE OF INDOOR HEATING AND HOT WATER

(71) Applicant: KYUNGDONG NAVIEN CO., LTD., Pyeongtaek-si, Gyeonggi-do (KR)

(72) Inventor: Tae-Sik Min, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 366 days.

(21) Appl. No.: 14/398,688

(22) PCT Filed: Apr. 15, 2013

(86) PCT No.: PCT/KR2013/003121
§ 371 (c)(1),
(2) Date: Nov. 3, 2014

(87) PCT Pub. No.: WO2013/165106
PCT Pub. Date: Nov. 7, 2013

(65) Prior Publication Data
US 2015/0090199 A1    Apr. 2, 2015

(30) Foreign Application Priority Data

May 3, 2012   (KR) ......................... 10-2012-0046725

(51) Int. Cl.
*F24H 1/18*    (2006.01)
*F24H 1/52*    (2006.01)
(Continued)

(52) U.S. Cl.
CPC ............. *F24H 1/18* (2013.01); *F24D 11/002* (2013.01); *F24D 19/1066* (2013.01); *F24H 1/52* (2013.01);
(Continued)

(58) Field of Classification Search
CPC ... F24D 3/02; F24D 3/08; F24D 3/082; F24D 3/087; F24D 3/105
See application file for complete search history.

(56) References Cited

U.S. PATENT DOCUMENTS 4,235,369 A * 11/1980 Huber ................. F24D 11/0228
126/613
4,473,351 A * 9/1984 Hill ........................... F23B 1/36
110/234

(Continued)

FOREIGN PATENT DOCUMENTS

CN    202101310 U    1/2012
EP    0 635 682 A1    1/1995

(Continued)

OTHER PUBLICATIONS

International Search Report dated Jul. 17, 2013, issued to the corresponding International Application No. PCT/KR2013/003121.

*Primary Examiner* — Nathaniel Herzfeld
(74) *Attorney, Agent, or Firm* — Stein IP, LLC (57) ABSTRACT

The boiler of the present invention which enables the simultaneous use of heating and hot water includes: an internal heating-water discharge line for heating water, which has a circulation path for heating water forcibly fed by an internal circulation pump between a tank and a main heat exchanger; a supply water discharge line for heating water, which has a circulation path for heating water forcibly fed by an external circulation pump and supplied and returned from/to the tank and an indoor heating mechanism; and a three-way valve provided on a second indoor heating water connecting pipe of the internal heating-water discharge line for heating water, which adjusts the degree to which it is opened according to the indoor heating load and the hot water load in order to supply hot water passing through the main heat exchanger to the tank and a hot-water heat (Continued)

exchanger. The internal heating-water discharge line of the boiler and the supply water discharge line for heating water are connected to the internal space of the tank disposed therebetween.

7 Claims, 8 Drawing Sheets

(51) Int. Cl.
    *F24H 9/20*     (2006.01)
    *F24D 11/00*     (2006.01)
    *F24D 19/10*     (2006.01)
    *F28D 20/00*     (2006.01)

(52) U.S. Cl.
    CPC ....... *F24H 9/2007* (2013.01); *F28D 20/0034* (2013.01); *F24D 2220/0257* (2013.01); *F24D 2220/08* (2013.01); *Y02E 60/142* (2013.01)

(56) References Cited

U.S. PATENT DOCUMENTS

| | | | | |
|---|---|---|---|---|
| 4,542,850 A | * | 9/1985 | Gilbert | ............... F24D 11/0228 236/20 R |
| 4,599,992 A | * | 7/1986 | Harding | ............. F24D 19/1066 122/13.3 |
| 5,727,396 A | * | 3/1998 | Boyd | ........................ F24D 3/18 237/2 B |
| 2010/0126705 A1 | * | 5/2010 | Furui | .................. F24D 11/0214 165/157 |
| 2011/0017152 A1 | * | 1/2011 | Min | .......................... F24D 3/08 122/19.1 |
| 2011/0073666 A1 | * | 3/2011 | Jang | ......................... F24D 3/08 236/12.11 |
| 2011/0139259 A1 | * | 6/2011 | Nagata | .................... F24D 3/082 137/1 |
| 2012/0046801 A1 | * | 2/2012 | Mori | ....................... F24H 1/145 700/300 |

FOREIGN PATENT DOCUMENTS

| | | | |
|---|---|---|---|
| EP | 2112439 A1 | * 10/2009 | ............. F24H 1/206 |
| JP | 2006007050 A | * 1/2006 | |
| KR | 2000-0016768 U | 9/2000 | |
| KR | 20-0370876 Y1 | 12/2004 | |
| KR | 10-2010-0091360 A | 8/2010 | |
| KR | 10-2011-0036289 A | 4/2011 | |
| KR | 10-2011-0097430 A | 8/2011 | |
| KR | 10-2011-0127933 A | 11/2011 | |

* cited by examiner

FIG.1

Prior Art

BOILER HAVING INCREASED INDOOR HEATING EFFICIENCY AND ENABLING SIMULTANEOUS USE OF INDOOR HEATING AND HOT WATER

CROSS-REFERENCE TO RELATED APPLICATIONS

This application is a national stage of International Application No. PCT/KR2013/003121, filed Apr. 15, 2013, which claims the benefit of priority to Korean Application No. 10-2012-0046725, filed May 3, 2012 in the Korean Intellectual Property Office. All disclosures of the documents named above are incorporated herein by reference.

BACKGROUND OF THE INVENTION

1. Field of the Invention

The present invention relates to a boiler having enhanced heating efficiency and enabling simultaneous use of heating and hot water and, in more particular, to a boiler having enhanced heating efficiency and enabling simultaneous use of heating and hot water, which can supply sufficient heating-water even if heating equipment has a small heating surface area to enhance heating efficiency and can utilize simultaneously heating and hot water in light of a heating load and hot water load.

2. Description of the Related Art

In general, a heating dedicated boiler is a heating device which heats heating-water to a determined temperature utilizing combustion heat generated when fuel is burned, and supplies heating-water to a place in need of heating.

Figure 1:
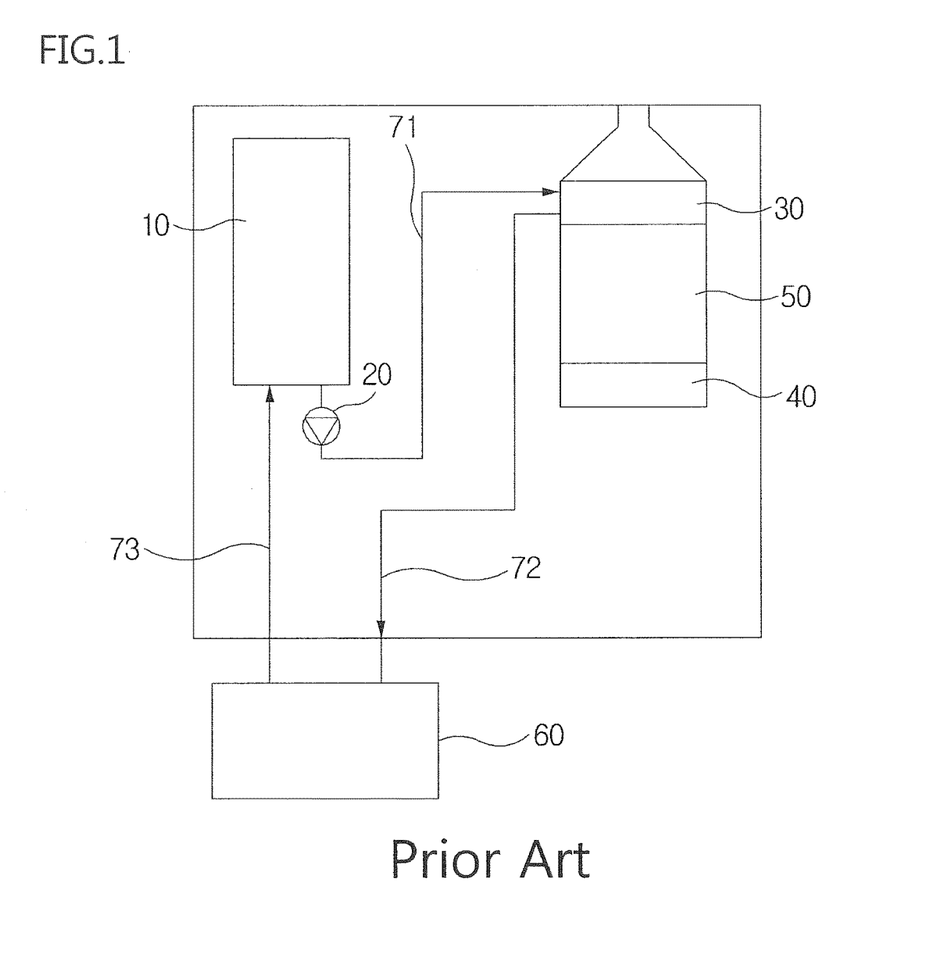
FIG. 1 is a view showing a schematic structure of a conventional heating dedicated boiler.

As shown in FIG. 1, a conventional heating dedicated boiler includes a tank 10 in which heating-water is stored; a circulation pump 20 for circularly supplying heating-water stored in the tank 10 to a main heat exchanger 30; a burner 40 for burning fuel so as to transfer combustion heat to heating-water passing through the main heat exchanger 30; a combustion chamber 50 providing a combustion space of the burner 40; a heating-water connecting pipe 71 through which heating-water stored in the tank 10 is supplied to the main heat exchanger 30; a heating-water supply pipe 72 through which heating-water heated by a heat exchange in the main heat exchanger 30 is supplied to heating equipment 60; and a heating-water return pipe 73 through which heating water, which has transferred heat to the heating equipment 60 and has a fallen temperature, is returned to the tank 10.

The conventional boiler constructed as above has the problem in that, if the heating equipment 60 has a small heating surface area, a supply amount of heating-water is limited so that a sufficient heating is not obtained by utilizing this heating equipment 60.

In other words, the conventional boiler has the problem in that, due to the structure in which heating-water heated in the main heat exchanger 30 is directly supplied to the heating equipment 60 through the heating-water supply pipe 72, an amount of heating-water supplied to the heating equipment 60 is limited to an amount of heating-water passing through the main heat exchanger 30 and then supplied to the heating equipment, and so in a case in which the heating equipment 60 has a small heating surface area, a supply amount of heating-water supplied to the heating equipment 60 is limited and, as a result, a heating is not done properly.

In the conventional boiler, therefore, in order that heating-water, whose supply amount is limited, transfers heat while passing through the heating equipment 60 to perform the heating properly, the heating equipment 60 should have a sufficiently large heating surface area. In the ondol heating (Korean floor heating system), for example, a piping of heating having a large heating surface area should be provided on an ondol floor. In a case in which the heating equipment 60 has a large heating surface area as above, a pressure loss of heating-water is also increased so that an efficiency of the boiler is lowered.

Meanwhile, depending on the heating surface area of the heating equipment 60, a supply temperature of heating-water supplied to the heating equipment 60 and a return temperature of heating-water which is returned after passing through the heating equipment 60 are determined. For example, if a high-capacity radiator having a large heating surface area as the heating equipment 60 performs the heating, the supply temperature of heating-water is set to 80° C. and the return temperature of heating-water is set to 60° C., and the heating is performed in the heating equipment 60 in response to the temperature difference of 20° C. between the supply temperature of heating-water and the return temperature of heating-water. If a small-capacity radiator having a small heating surface area as the heating equipment 60 performs the heating, the supply temperature of heating-water is set to 80° C. and the return temperature of heating-water is set to 70° C., and the heating is performed in the heating equipment 60 in response to the temperature difference of 10° C. between the supply temperature of heating-water and the return temperature of heating-water. As compared with the heating performed by utilizing the high-capacity radiator, therefore, in a case in which the heating is performed by utilizing a small-capacity radiator, a supply amount of heating-water, which is twice that for the high-capacity radiator, is necessarily required to perform the heating at the level which is the same as that of the heating performed by the high-capacity radiator.

However, in a case in which the heating equipment 60 has a small heating surface area, since a great quantity of heating-water which is circulated is required in order that the heating is performed at the level which is equal to that of the heating performed by the heating equipment having a large heating surface area, an amount of heating-water passing through the main heat exchanger 30 is also increased so that an element such as a heat transfer pin and the like provided in the main heat exchanger 30 for a heat transfer is eroded and corroded by an excessive amount of heating-water to deteriorate durability of and to reduce a service life of the main heat exchanger 30. In addition, since capacity of the circulation pump 20 provided in the boiler should be increased so as to supply a great quantity of heating-water to the main heat exchanger 30, an entire volume and weight of the boiler are increased and a great expense is required for manufacturing the boiler.

SUMMARY OF THE INVENTION

Technical Problem

The present invention is invented to solve the above-mentioned problems, an object of the present invention is to provide a boiler which prevents a shortage and a pressure loss of heating-water supplied heating equipment to enhance heating efficiency even if heating equipment has a small heating surface area, and delivers some heating-water to a hot-water heat exchanger to heat cold water into hot water if there is a hot water load. As a result, the boiler of the present invention can utilize simultaneously the heating and hot water.

Another object of the present invention is to provide a boiler which can supply a sufficient amount of heating-water to heating equipment to reduce a capacity of an internal circulation pump provided therein even if an excessive amount of heating-water does not pass through a heat exchanger and can prevent a corrosion generated by an erosion of a main heat exchanger caused when an excessive amount of heating-water flows in the main heat exchanger to extend a service life of the main heat exchanger.

Yet another object of the present invention is to provide a boiler having the structure which can control easily a temperature of heating-water so that a temperature of heating-water supplied to the heating equipment becomes a predetermined supply target temperature of heating-water.

Technical Solution

In order to achieve the above-mentioned object, a boiler of the present invention has enhanced heating efficiency and enabling simultaneous use of heating and hot water and includes a tank 110 having a space provided therein for storing heating-water, a main heat exchanger 130 for heating heating-water using combustion heat of a burner 140 and a hot-water heat exchanger 180 for heating cold water into hot water through a heat exchange between heating-water heated in the main heat exchanger 130 and the cold water, the boiler of the present invention includes an internal heating-water piping line 160 composed of a first heating-water connecting pipe 160*a* through which heating-water in the tank 110 is supplied to the main heat exchanger 130 and a second heating-water connecting pipe 160*b* through which heating-water passed through the main heat exchanger 130 is supplied to the tank 110, thereby forming a heating-water circulation flow path for heating-water forcibly fed by an internal circulation pump 120 between the tank 110 and the main heat exchanger 130; a heating-water supply piping line 210 composed of a heating-water supply pipe 210*a* for supplying heating-water in the tank 110 to heating equipment 230 and a heating-water return pipe 210*b* for returning heating-water passed through the heating equipment 230 to the tank 110, thereby forming a heating-water circulation flow path for supplying and returning heating-water forcibly fed by an external circulation pump 220 between the tank 110 and the heating equipment 230; and a three way valve 170 provided on the second heating-water connecting pipe 160*b*, an opening rate thereof being adjusted depending on a heating load and hot water load to supply heating-water passed through the main heat exchanger 130 toward the tank 110 and the hot-water heat exchanger 180. Here, the boiler internal water piping line 160 and the heating-water supply piping line 210 are connected to each other via the space in the tank 110.

In this case, a first connecting pipe 191 is installed between the three way valve 170 and the hot-water heat exchanger 180 for supplying heating-water passed through the main heat exchanger 130 to the hot-water heat exchanger 180 and a second connecting pipe 192 for returning heating-water passed through the hot-water heat exchanger 180 to the tank 110 is installed between the hot-water heat exchanger 180 and the tank 110.

In addition, the internal circulation pump 120 is provided on the first heating-water connecting pipe 160*a* and the external circulation pump 220 may be provided on the heating-water supply pipe 210*a*.

Also, a main heat exchanger connecting port 111 connected to the second heating-water connecting pipe 106*b* and a heating-water supplying port 112 connected to the heating-water supply pipe 210*a* are formed on an upper portion of the tank 110, and a heating-water returning port 113 connected to the heating-water return pipe 210*b*, a pump connecting port 114 connected to the internal circulation pump 120 provided on the first heating-water connecting pipe 160*a* and a heating-water inlet port 115 connected to the second connecting pipe 192 are formed on a lower portion of the tank 110.

In addition, an air/water separator 116 for discharging air contained in heating-water in the tank 110 to an outside of the tank 110 is provided on the upper portion of the tank 110.

Furthermore, a filter 117 for filtering foreign substance contained in heating-water flowing into the tank 110 through the heating-water returning port 113 and the heating-water inlet port 115 is provided on the lower portion of the tank 110.

Also, the heating-water supply pipe 210*a* is provided with a first temperature sensor 211 for measuring a temperature of heating-water supplied from the tank 110 to the heating equipment 230 and the second heating-water connecting pipe 160*b* is provided with a second temperature sensor 161 for measuring a temperature of heating-water heated in the main heat exchanger 130 and supplied to from the tank 110, whereby a temperature T3 of heating-water, which is measured by the second temperature sensor 161, is controlled by adjusting the combustion rate of the burner 140 so that a supply temperature T2 of heating-water, which is measured by the first temperature sensor 211, reaches a first supply target temperature T1 of heating-water.

In the hot water mode of the boiler, the three way valve 170 has a heating-water supply flow path for heating-water to supply all of the amount of heating-water, which flows from the main heat exchanger 130, to the tank 110, heating-water in the tank 110 passes through the internal circulation pump 120 via the pump connecting port 114 and is then supplied to the main heat exchanger 130, heating-water heated in the main heat exchanger 130 passes through the three way valve 170 and flows into the tank 110 via the main heat exchanger connecting port 111, heating-water in the tank 110 passes through the external circulation pump 220 via the heating-water supplying port 112 and is supplied to the heating equipment 230 and is then entered the tank 110 via the heating-water returning port 113, some heating-water entered the tank 110 via the heating-water returning port 113 is supplied to the main heat exchanger 130 via the pump connecting port 114, and the remainder of heating-water is mixed with heating-water entered the tank via the main heat exchanger connecting port 111 and then supplied to the heating equipment 230 via the heating-water supplying port 112.

In the mode for simultaneous use of heating and hot water, in addition, the opening rate of the three way valve 170 is adjusted in proportion to the heating load and the hot water load so that heating-water flowing from the main heat exchanger 130 flows into the tank 110 and the hot-water heat exchanger, heating-water in the tank 110 passes through the internal circulation pump 120 via the pump connecting port 114 and is then supplied to the main heat exchanger 130, some heating-water heated in the main heat exchanger 130 passes through the three way valve 170 and flows into the tank 110 via main heat exchanger connecting port 111, heating-water in the tank 110 passes through the external circulation pump 220 via the heating-water supplying port 112 and is supplied to the heating equipment 230 and is then entered the tank 110 via the heating-water returning port 113, the remainder of heating-water heated in the main heat exchanger 130 flows into the hot-water heat exchanger 180 via the three way valve 170 and is heat-exchanged with cold water and then flows into the tank 110 via the heating-water inlet port 115, some heating-water entered the tank 110 via the heating-water returning port 113 and the heating-water inlet port is supplied to the main heat exchanger 130 via the pump connecting port 114, and the remainder of heating-water is mixed with heating-water entered the tank via the main heat exchanger connecting port 111 and then supplied to the heating equipment 230 via the heating-water supplying port 112.

Advantageous Effects

According to the boiler having enhanced heating efficiency and enabling simultaneous use of heating and hot water, the boiler is advantageous in that, by connecting the internal water piping line of the boiler and the heating-water supply piping line to each other via the internal space of the tank, it is possible to supply a sufficient amount of heating-water to the heating equipment (a place in need of heating) even if the heating equipment has a small heating surface area to enhance the heating efficiency, and by adjusting an opening rate of the three way valve in proportion to a heating load and a hot water load, a heating and hot water can be simultaneously utilized.

In addition, according to the present invention, the boiler is advantageous in that, even if a pump having a small capacity is employed as the internal circulation pump installed in the boiler, a sufficient amount of heating-water can be supplied to the heating equipment and it is possible to prevent an increase of an amount of heating-water passing through the main heat exchanger to prevent a corrosion caused by an erosion of the main heat exchanger, to enhance the durability and to extend the service life.

Furthermore, according to the present invention, the boiler is advantageous in that the temperature of heating-water supplied from the main heat exchanger to the tank is controlled so that the supply temperature of heating-water, which is measured by the first temperature sensor becomes the first supply target temperature of heating-water, therefore, the supply temperature of heating-water can be easily controlled.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

| REFERENCE NUMERAL | |
|---|---|
| 10: Tank | 20: Circulation pump |
| 30: Main heat exchanger | 40: Burner |
| 50: Combustion chamber | 60: Heating equipment |
| 71: Heating-water connecting pipe | 72: Heating-water supply pipe |
| 73: Heating-water return pipe | 100: Main body of boiler |
| 110: Tank | 111: Main heat exchanger connecting port |
| 112: Heating-water supplying port | 113: Heating-water returning port |
| 114: Pump connecting port | 115: Heating-water inlet port |
| 116: Air/water separator | 117: Filter |
| 120: Internal circulation pump | 130: Main heat exchanger |
| 140: Burner | 150: Combustion chamber |
| 160: Boiler internal water piping line | 160a: First heating-water connecting pipe |
| 160b: Second heating-water connecting pipe | |
| 161: Second temperature sensor | |
| 170: Three way valve | 180: Hot-water heat exchanger |
| 191: First connecting pipe | 192: Second connecting pipe |
| 193: Cold water pipe | 194: Hot water pipe |
| 210: Heating-water supply piping line | 210a: Heating-water supply pipe |
| 210b: Heating-water return pipe | 211: First temperature sensor |
| 220: External circulation pump | 230: Heating equipment |

DETAILED DESCRIPTION OF THE EMBODIMENTS

Hereinafter, a structure and an operation of the preferred embodiment of the present invention are illustrated in detail with reference to the accompanying drawings.

Figure 2:
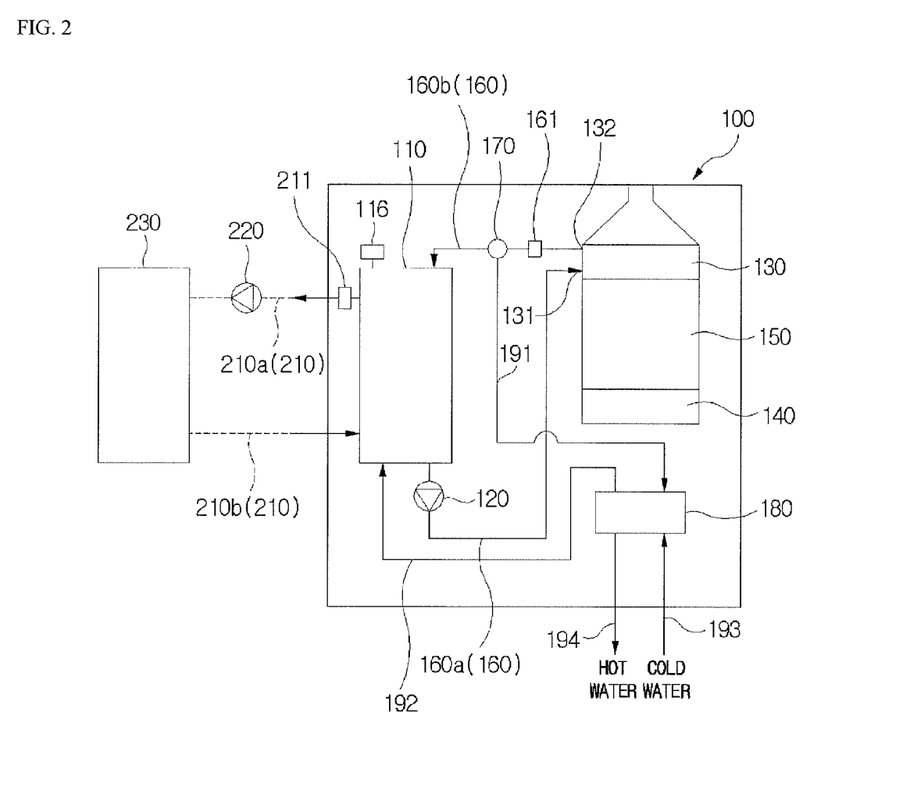
FIG. 2 is a view showing a schematic structure of a boiler according to the present invention.

FIG. 2 is a view showing a schematic structure of a boiler according to the present invention.

In a boiler according to the present invention, a tank 10 in which a space for storing heating-water is provided; a main heat exchanger 130 for heating heating-water through a heat exchange between heating-water and product of combustion generated by combustion of a burner 140; an internal circulation pump 120 for circularly supplying heating-water in the tank 110 to the main heat exchanger 130; the burner 140 for burning fuel to transmit combustion heat to heating-water passing through the main heat exchanger 130; a combustion chamber 150 providing a combustion space of the burner 140; a hot-water heat exchanger 180 for heating cold water through a heat exchange between heating-water heated in the main heat exchanger 130 and cold water and supplying hot water; and a three way valve 170 forming a flow path of heating-water so as to supply heating-water heated in the main heat exchanger 130 to the main heat exchanger 130 in proportion to a heating load and hot water load are provided in a main body 100 of the boiler.

A boiler internal water piping line 160 is installed between one side of the tank 10 and the main heat exchanger 130 for circularly supplying heating-water. The boiler internal water piping line 160 is composed of a first heating-water connecting pipe 160a connected to an inlet 131 of the main heat exchanger 130 at one side of a lower portion of the tank 110 to supply heating-water in the tank 110 to the main heat exchanger 130 and a second heating-water connecting pipe 160b connected to one side of an upper portion of the tank 110 at an outlet 132 of the main heat exchanger 130 to supply heating-water heated in the main heat exchanger 130 to the tank 110, and the internal circulation pump 120 is provided on the first heating-water connecting pipe 160a for forcibly feeding heating-water so as to circulate heating-water between the tank 110 and the main heat exchanger 130.

A heating-water supply piping line 210 is installed at the other side of the tank 110 for circularly supplying heating-water to heating equipment 230 such as a radiator and the like. The heating-water supply piping line 210 consists of a heating-water supply pipe 210a for supplying high-temperatured heating-water in the tank 110 to the heating equipment and a heating-water return pipe 210b for returning heating-water whose temperature is lowered after passing through the heating equipment 230 and transferring heat, and an external circulation pump 220 is provided on the heating-water supply pipe 210a for forcibly feeding heating-water so as to circulate heating-water between the tank 110 and the heating equipment 230.

A first temperature sensor 211 is provided on the heating-water supply pipe 210a adjacent to the outlet of the heating-water supply piping line 210 for measuring a temperature of heating-water supplied from the tank 110 to the heating equipment 230, and the second temperature sensor 161 is provided on the second heating-water connecting pipe 160b for measuring a temperature of heating-water heated in the main heat exchanger 130 and supplied to the tank 110.

The tank 110 has a space formed therein for storing heating-water so that the internal water piping line 160 and the heating-water supply piping line 210 are connected to each other via the internal space of the tank 110.

The three way valve 170 is provided on the second heating-water connecting pipe 160b so that a supply flow path of heating-water which is heated while passing through the main heat exchanger 130 is selectively connected to any one of the tank 110 and the hot-water heat exchanger 180, or an opening rate of flow path connected to the second heating-water connecting pipe 160b from the three way valve 170 to the tank 110 and an opening rate of flow path connected to a first connecting pipe 191 from the three way valve 170 to the hot-water heat exchanger 180 are adjusted in proportion to the heating load and the hot water load. In addition, a second connecting pipe 192 connected to the tank 110 is provided at an outlet of the hot-water heat exchanger 180, and a cold water pipe 193 into which cold water flows and a hot water pipe 194 from which heated hot water is discharged is connected to and installed at the hot-water heat exchanger 180.

Figure 3:
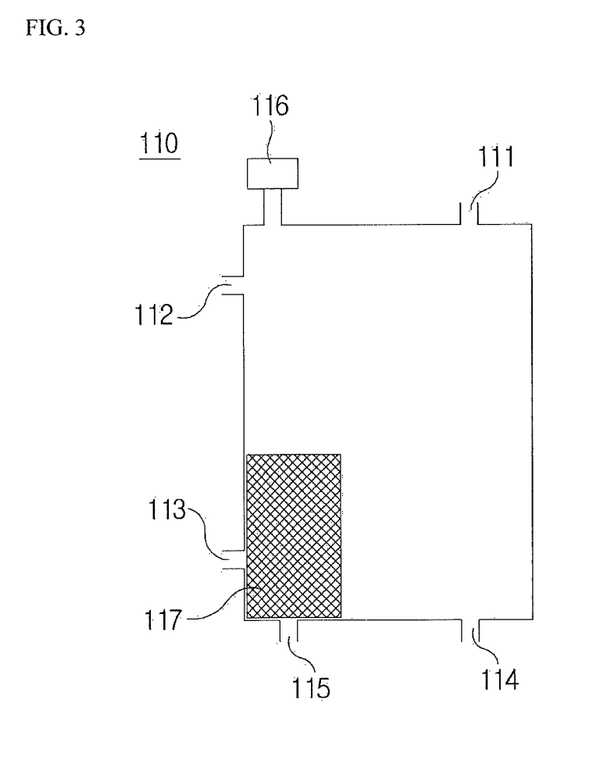
FIG. 3 is an enlarged view of a tank provided in the boiler according to the present invention.

FIG. 3 is an enlarged view of the tank provided in the boiler according to the present invention.

Referring to FIG. 3, a main heat exchanger connecting port 111 connected to the second heating-water connecting pipe 160b is formed on one side of an upper portion of the tank 110, and a heating-water supplying port 112 connected to the heating-water supply pipe 210a is formed on the other side of the upper portion of the tank 110. A pump connecting port 114 connected to the internal circulation pump 120 installed on the first heating-water connecting pipe 160a is formed on one side of a lower portion of the tank 110, and a heating-water returning port 113 connected to the heating-water return pipe 210b and a heating-water inlet port 115 connected to the second connecting pipe 192 are formed on the other side of the lower portion of the tank 110.

On an upper portion of the tank 110, in addition, an air/water separator 116 is provided for discharging air contained in heating-water in the tank 110 out of the tank 110, and a filter 117 is provided on the lower portion of the tank 110 for filtering foreign substances contained in heating-water flowing into the tank 110 via the heating-water returning port 113 after passing through the heating equipment 230 and contained in heating-water flowing into the tank 110 via the second connecting pipe 192.

Hereinafter, operations for supplying heating-water heated in the main heat exchanger 130 to the heating equipment 230 and for returning heating-water, which has passed through the heating equipment 230, via the tank 110 constructed as above are illustrated.

Figure 4:
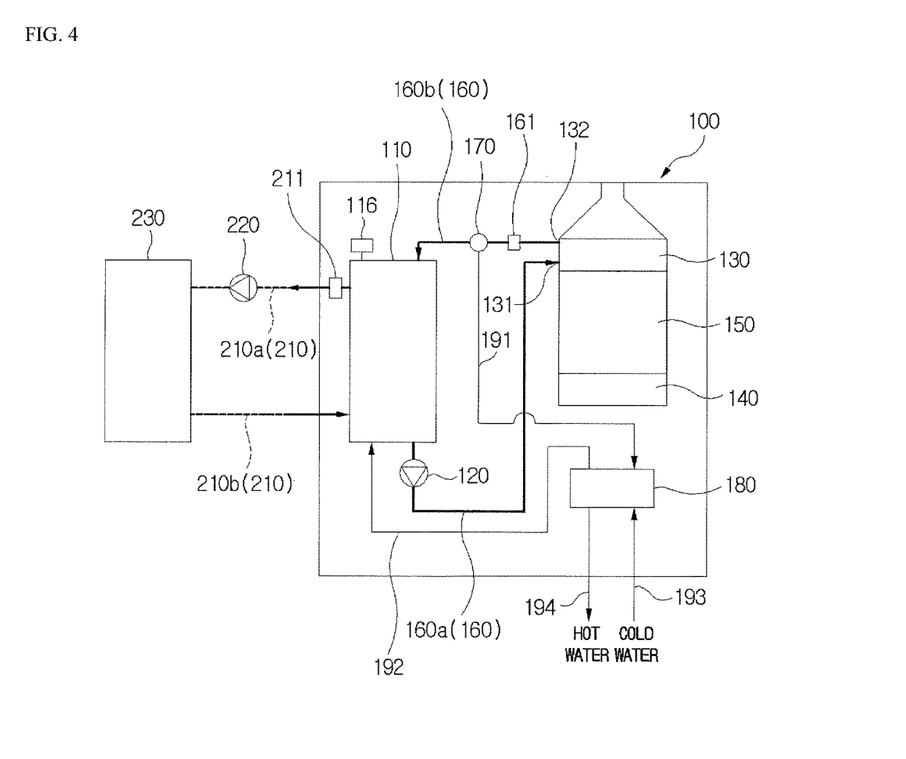
FIG. 4 is a view showing an operation state in the boiler according to the present invention in a heating mode.
Figure 5:
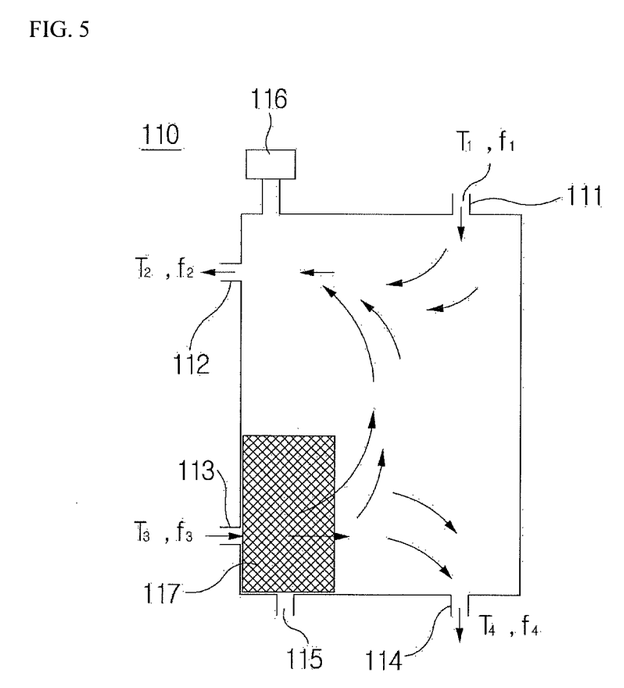
FIG. 5 is a view showing a flow of heating-water in the tank of the boiler according to the present invention in a heating mode.

FIG. 4 is a view showing an operation state of the boiler according to the present invention in a heating mode, and FIG. 5 is a view showing a flow of heating-water in the tank of the boiler according to the present invention in a heating mode.

In the heating mode of the boiler, the three way valve 170 has a supply flow path for allowing all of heating-water, which flows from the main heat exchanger 130, to be supplied to the tank 110. Heating-water in the tank 110 passes through the internal circulation pump 120 via the pump connecting port 114 and is then supplied to the main heat exchanger 130. Heating-water heated in the main heat exchanger 130 passes through the three way valve 170 and flows into the tank 110 via the main heat exchanger connecting port 111. Heating-water in the tank 110 passes through the external circulation pump 220 via the heating-water supplying port 112 and is supplied to the heating equipment 230 and is then entered the tank 110 via the heating-water returning port 113. Some heating-water flowing entered the tank 110 via the heating-water returning port 113 is supplied to the main heat exchanger 130 via the pump connecting port 114, and the remainder of heating-water is mixed with heating-water entered the tank via the main heat exchanger connecting port 111 and then supplied to the heating equipment 230 via the heating-water supplying port 112.

As some heating-water flowing into the tank 110 via the heating-water returning port 113 is supplied to the heating equipment 230 via the heating-water supplying port 112, as compared with the flow rate f3 of heating-water flowing into the tank 110 through the heating-water returning port 113 and the flow rate f2 of heating-water supplied to the heating equipment 230 through the heating-water supplying port 112, the flow rate f1 of heating-water flowing into the tank 110 through the main heat exchanger connecting port 111 and the flow rate f4 of heating-water discharged to the main heat exchanger 130 via the pump connecting port 114 can be reduced (f1, f4<f2, f3).

In this case, the temperature T3 of heating-water flowing into the tank 110 via the heating-water returning port 113 becomes equal to the temperature T4 of heating-water supplied from the tank 110 to the main heat exchanger 130 via the pump connecting port 114 (T3=T4) and due to mixing heating-water supplied from the tank 110 to the heating equipment 230 via the heating-water supplying port 112 with returned heating-water, the temperature T2 of heating-water supplied from the tank 110 to the heating equipment 230 becomes lower than the temperature T1 of heating-water heated in the main heat exchanger 130 and flowing into the tank 110 via the main heat exchanger connecting port 111 (T2<T1). However, as the flow rate of heating water supplied to the heating equipment 230 is increased, a heat exchange is smoothly performed in the heating equipment 230. As a result, it is possible to obtain a high heating performance.

Therefore, it is possible to reduce the flow rate of heating-water flowing along the internal water piping line 160 provided in the main body 100 of the boiler and, at the same time, to secure the sufficient flow rate of heating-water supplied from the tank 110 to the heating equipment 230. Consequently, a permissible capacity of the internal circulation pump 120 can be reduced so that a volume and a weight of the boiler can be reduced, a manufacturing cost can be lowered and it is possible to prevent excessive heating-water from passing through the main heat exchanger 130 to prevent damage of the main heat exchanger 130 caused by a corrosion.

In addition, even if the heating equipment 230 has a small heating surface area, since it is possible to supply of heating-water with the sufficient flow rate through the heating-water supply piping line 210 between the tank 10 and the heating equipment 230, a heat transfer can be smoothly carried out in the heating equipment 230 to enhance heating performance for a place in need of heating.

In the present invention, furthermore, a temperature T3 of heating-water, which is measured by the second temperature sensor 161, is controlled by adjusting the combustion rate of the burner 140 so that a supply temperature T2 of heating-water, which is measured by the first temperature sensor 211, reaches a first supply target temperature T1 of heating-water. As a result, it is possible to easily control the supply temperature of heating-water.

As one embodiment, if the first supply target temperature T1 of heating-water to be supplied from the tank 110 to the heating equipment 230 is set to 80° C., the temperature of heating-water passing the heating equipment 230 and returned to the tank 110 is determined by the heating surface area of the heating equipment 230. For example, the temperature of heating-water to be returned may be set to 80° C. In this case, in order that the temperature T2 of heat-water, which is measured by the first temperature sensor 211, reaches ° C. which is the first supply target temperature T1 of heating-water, the second supply target temperature T4 of heating-water supplied to the main heat exchanger 130 to the tank 110 is set to 90° C., and in order that the temperature of heat-water, which is measured by the second temperature sensor 161, reaches the second supply target temperature T4 of heating-water, the combustion rate of the burner 140 is controlled.

As described above, in the present invention, the temperature T2 of heating-water is measured by the first temperature sensor 211 provided on the heating-water supply pipe 210a and the combustion rate of the burner 140 is adjusted so that the measured temperature T2 reaches the first supply target temperature T1 and the temperature T3 of heating-water, which is measured by the second temperature sensor 161, becomes a second supply target temperature T4. As a result, it is possible to easily control the temperature of heating-water.

Figure 6:
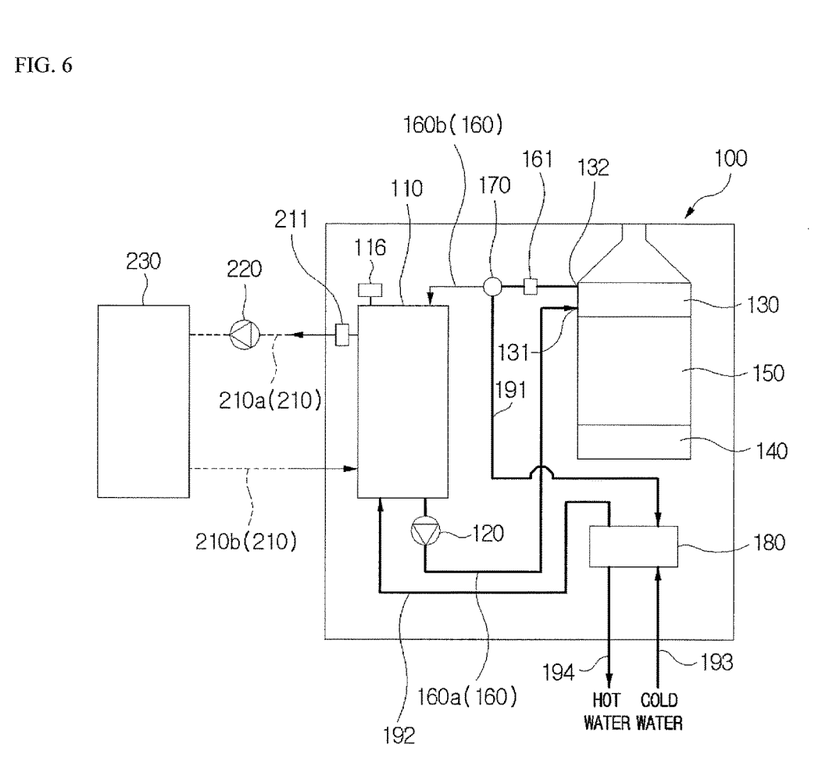
FIG. 6 is a view showing an operation state of the boiler according to the present invention in a hot water mode.

FIG. 6 is a view showing an operation state of the boiler according to the present invention in a hot water mode.

In a case in which there is no heating load when the boiler is in the hot water mode, the three way valve 170 closes the flow path connected to the second heating-water connecting pipe 160b extending to the tank 110 and opens the flow path connected to the first connecting pipe 191 extending to the hot-water heat exchanger 180 so that all heating-water heated in the main heat exchanger 130 is supplied to the hot-water heat exchanger 180. After transferring heat to cold water entered the hot-water heat exchanger 180 through the cold water pipe 193, heating-water supplied to the hot-water heat exchanger 180 flows into the tank 110 through the second connecting pipe 192 and is then stored in the tank 110. Heating-water stored in the tank 110 is circularly supplied to the main heat exchanger 130 via the first heating-water connecting pipe 160a.

Figure 7:
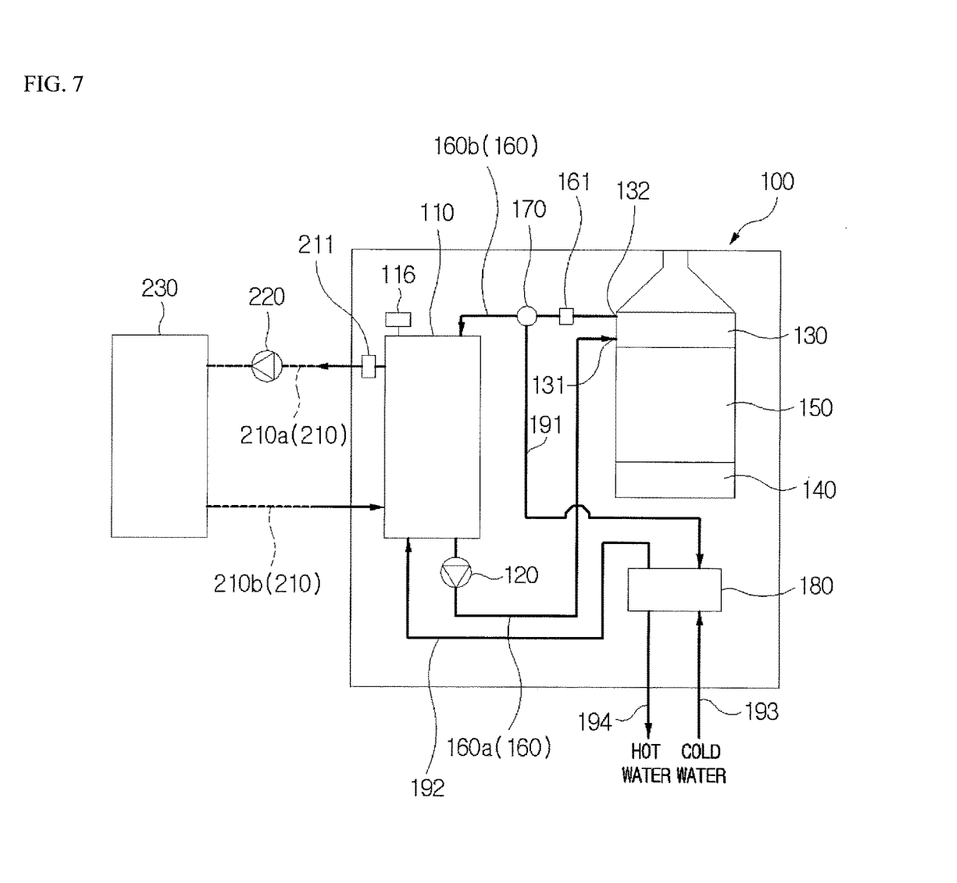
FIG. 7 is a view showing an operation state of the boiler according to the present invention in a mode for simultaneous use of heating and hot water.
Figure 8:
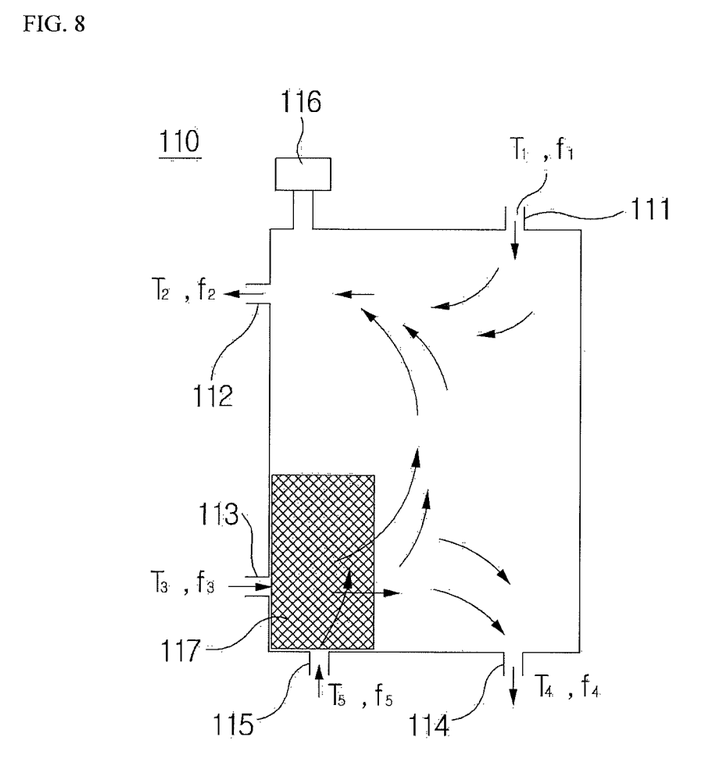
FIG. 8 is a view showing a flow of heating-water in the tank of the boiler according to the present invention in a mode for simultaneous use of heating and hot water.

FIG. 7 is a view showing an operation state of the boiler according to the present invention in a mode for simultaneous use of heating and hot water, and FIG. 8 is a view showing a flow of heating-water in the tank of the boiler according to the present invention in a mode for simultaneous use of heating and hot water.

In the mode for simultaneous use of heating and hot water of the boiler, the opening rate of the three way valve 170 is adjusted in order that heating-water flowing from the main heat exchanger 130 to the three way valve 170 is dividedly directed to the tank 110 and the hot-water heat exchanger 180 in proportion to the heating load and the hot water load. Heating-water in the tank 110 flows into the internal circulation pump 120 via the pump connecting port 1140 and is then supplied to the main heat exchanger 130. Some heating-water heated in the main heat exchanger 130 passes through the three way valve 170 and flows into the tank 110 through the main heat exchanger connecting port 111, and heating-water in the tank 110 flows into the external circulation pump 220 via the heating-water supplying port 112 and is then supplied to the heating equipment 230. Finally, heating-water is entered the tank 110 via the heating-water returning port 113. The remainder of heating-water heated in the main heat exchanger 130 passes through the three way valve 170 and flows into the hot-water heat exchanger 180. After heat exchanging with cold water in the hot-water heat exchanger, heating-water flows into the tank 110 via the heating-water inlet port 115. T5 and f5 in FIG. 8 indicate a temperature and a flow rate of heating-water flowing into the tank 110 through the via heating-water inlet port 115, respectively.

Some heating-water entered the tank 110 via the heating-water returning port 113 and the heating-water inlet port 115 is supplied to the main heat exchanger 130 via the pump connecting port 114, and the remainder of heating-water is mixed with heating-water entered via the main heat exchanger connecting port 111 and is then supplied to the heating equipment 230 through the heating-water supplying port 112.

When heating-water and hot water are simultaneously utilized, as illustrated in the description for the mode for simultaneous use of heating and hot water of the boiler, since the present invention as described above prevents excessive heating-water from passing through the main heat exchanger 130, a service life of the main heat exchanger 130 extends, a capacity of the internal circulation pump 120 can be reduced, it is possible to prevent a lack of heating-water supplied to the heating equipment 230 and a pressure loss, and heating-water and hot water can be simultaneously utilized by adjusting the opening rate of the three way valve 170.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A boiler having enhanced heating efficiency and enabling simultaneous use of heating and hot water, the boiler including a tank having a space provided therein for storing heating-water, a main heat exchanger for heating heating-water using combustion heat of a burner and a hot-water heat exchanger for heating cold water into hot water through a heat exchange between heating-water heated in the main heat exchanger and the cold water, comprising;
- a boiler internal water piping line composed of a first heating-water connecting pipe through which heating-water in the tank is supplied to the main heat exchanger and a second heating-water connecting pipe through which heating-water passed through the main heat exchanger is supplied to the tank, thereby forming a heating-water circulation flow path for heating-water forcibly fed by an internal circulation pump between the tank and the main heat exchanger;
- a heating-water supply piping line composed of a heating-water supply pipe for supplying heating-water in the tank to heating equipment and a heating-water return pipe for returning heating-water passed through the heating equipment to the tank, thereby forming a heating-water circulation flow path for supplying and returning heating-water forcibly fed by an external circulation pump between the tank and the heating equipment; and
- a three way valve provided on the second heating-water connecting pipe, an opening rate thereof being adjusted depending on a heating load and hot water load to supply heating-water passed through the main heat exchanger toward the tank and the hot water exchanger,
- wherein the boiler internal water piping line and the heating-water supply piping line are connected to each other via the space in the tank,
- wherein a first connecting pipe is installed between the three way valve and the hot-water heat exchanger for supplying heating-water passed through the main heat exchanger to the hot-water heat exchanger and a second connecting pipe for returning heating-water passed through the hot-water heat exchanger to the tank is installed between the hot-water heat exchanger and the tank,
- the second connecting pipe, the first heating-water connecting pipe, and the heating-water return pipe are installed separately from one another,
- wherein a main heat exchanger connecting port connected to the second heating-water connecting pipe is formed on one side of an upper portion of the tank, and a heating-water supplying port connected to the heating-water supply pipe is formed on the other side of the upper portion of the tank, and a pump connecting port connected to the internal circulation pump installed on the first heating-water connecting pipe is formed on one side of a lower portion of the tank, and a heating-water returning port connected to the heating-water return pipe and a heating-water inlet port connected to the second connecting pipe are formed on the other side of the lower portion of the tank.

2. The boiler having enhanced heating efficiency and enabling simultaneous use of heating and hot water of claim 1, wherein the internal circulation pump is provided on the first heating-water connecting pipe and the external circulation pump is provided on the heating-water supply pipe.

3. The boiler having enhanced heating efficiency and enabling simultaneous use of heating and hot water of claim 1, wherein an air/water separator for discharging air contained in heating-water in the tank to an outside of the tank is provided on the upper portion of the tank.

4. The boiler having enhanced heating efficiency and enabling simultaneous use of heating and hot water of claim 1, wherein a filter for filtering foreign substance contained in heating-water flowing into the tank through the heating-water returning port and the heating-water inlet port is provided on the lower portion of the tank.

5. The boiler having enhanced heating efficiency and enabling simultaneous use of heating and hot water of claim 1, wherein the heating-water supply pipe is provided with a first temperature sensor for measuring a temperature of heating-water supplied from the tank to the heating equipment and the second heating-water connecting pipe is provided with a second temperature sensor for measuring a temperature of heating-water heated in the main heat exchanger and supplied to the tank, whereby a temperature of heating-water, which is measured by the second temperature sensor, is controlled by adjusting the combustion rate of the burner so that a supply temperature of heating-water, which is measured by the first temperature sensor, reaches a first supply target temperature of heating-water.

6. The boiler having enhanced heating efficiency and enabling simultaneous use of heating and hot water of claim 1, wherein, in the hot water mode of the boiler, the three way valve has a heating-water supply flow path for allowing all of heating-water, which flows from the main heat exchanger, to be supplied to the tank, heating-water in the tank passes through the internal circulation pump via the pump connecting port and is then supplied to the main heat exchanger, heating-water heated in the main heat exchanger passes through the three way valve and flows into the tank via the main heat exchanger connecting port, heating-water in the tank passes through the external circulation pump via the heating-water supplying port and is supplied to the heating equipment and then enters the tank via the heating-water returning port, some heating-water entered the tank via the heating-water returning port is supplied to the main heat exchanger via the pump connecting port, and the remainder of heating-water is mixed with heating-water entered the tank via the main heat exchanger connecting port and then supplied to the heating equipment via the heating-water supplying port.

7. The boiler having enhanced heating efficiency and enabling simultaneous use of heating and hot water of claim 1, wherein, in the mode for simultaneous use of heating and hot water, the opening rate of the three way valve is adjusted in proportion to the heating load and the hot water load so that heating-water flowing from the main heat exchanger flows into the tank and the hot-water heat exchanger, heating-water in the tank passes through the internal circulation pump via the pump connecting port and is then supplied to the main heat exchanger, some heating-water heated in the main heat exchanger passes through the three way valve and flows into the tank via main heat exchanger connecting port, heating-water in the tank passes through the external circulation pump via the heating-water supplying port and is supplied to the heating equipment and is then enters the tank via the heating-water returning port, the remainder of heating-water heated in the main heat exchanger flows into the hot-water heat exchanger via the three way valve and is heat-exchanged with cold water and then flows into the tank via the heating-water inlet port, some heating-water entered the tank via the heating-water returning port and the heating-water inlet port is supplied to the main heat exchanger via the pump connecting port, and the remainder of heating-water is mixed with heating-water entered the tank via the main heat exchanger connecting port and then supplied to the heating equipment via the heating-water supplying port.

* * * * *